United States Patent
Wendt

(10) Patent No.: US 10,045,428 B2
(45) Date of Patent: Aug. 7, 2018

(54) CONTROLLING SYSTEM FOR CONTROLLING A POWER/DATA-COMMUNICATION SYSTEM

(71) Applicant: PHILIPS LIGHTING HOLDING B.V., Eindhoven (NL)

(72) Inventor: Matthias Wendt, Eindhoven (NL)

(73) Assignee: PHILIPS LIGHTINGHOLDING B.V., Eindhoven (NL)

( * ) Notice: Subject to any disclaimer, the term of this patent is extended or adjusted under 35 U.S.C. 154(b) by 0 days.

(21) Appl. No.: 15/517,002

(22) PCT Filed: Oct. 15, 2015

(86) PCT No.: PCT/EP2015/073891
§ 371 (c)(1),
(2) Date: Apr. 5, 2017

(87) PCT Pub. No.: WO2016/059160
PCT Pub. Date: Apr. 21, 2016

(65) Prior Publication Data
US 2017/0311419 A1    Oct. 26, 2017

(30) Foreign Application Priority Data

Oct. 15, 2014    (EP) .................................. 14189048

(51) Int. Cl.
*H05B 37/02*    (2006.01)

(52) U.S. Cl.
CPC ............................... *H05B 37/0254* (2013.01)

(58) Field of Classification Search
CPC ............ H05B 33/0896; H05B 37/0245; H05B 37/0254; H05B 41/3925; H05B 41/391;
(Continued)

(56) References Cited

U.S. PATENT DOCUMENTS 6,313,587 B1 * 11/2001 MacLennan .......... H01J 61/025
    315/224
7,566,987 B2    7/2009 Black et al.
(Continued)

FOREIGN PATENT DOCUMENTS

CA         2886001 A1    3/2014
WO    WO2012011038 A1    1/2012
(Continued)

OTHER PUBLICATIONS

NCP1081: "Integrated High Power PoE-PD Interface & DC-DC Converter Controller", Semiconductor Components Industries, LLC, 2013, May 2013—Rev. 7, pp. 1-18.
(Continued)

*Primary Examiner* — Thai Pham
*Assistant Examiner* — Syed M Kaiser

(57) ABSTRACT

The invention relates to a controlling system (4) for controlling loads (2), especially lighting units, of a power/data-communication system like a PoE system, wherein a command is provided, which defines desired power levels of loads of the power/data-communication system. An overall power change amount is determined, which will be caused by the provided command, and the loads are controlled such that the slope of the overall power consumption of the loads, when being set to the desired power levels, is reduced, if the determined overall power change amount is larger than a predefined power change threshold. Thus, if the provided command may lead to an overall power change amount causing problems like blown fuses, the loads are controlled such that the slope of the overall power consumption of the loads, when being set to the desired power levels, and hence the likelihood of, for instance, blown fuses is reduced.

14 Claims, 5 Drawing Sheets

(58) Field of Classification Search
CPC ............ H05B 41/2828; H05B 33/0803; H05B 37/0272; H05B 33/0857; H05B 33/0887
USPC ................ 315/294, 297, 307, 122, 192, 224
See application file for complete search history.

(56) References Cited

U.S. PATENT DOCUMENTS

| | | | | |
|---|---|---|---|---|
| 8,415,901 | B2* | 4/2013 | Recker | H05B 33/0803 315/307 |
| 2007/0174527 | A1 | 7/2007 | Vorenkamp | |
| 2009/0299543 | A1* | 12/2009 | Cox | G06F 1/203 700/299 |
| 2009/0315400 | A1 | 12/2009 | Howe et al. | |
| 2010/0213859 | A1* | 8/2010 | Shteynberg | H05B 33/0815 315/224 |
| 2010/0327766 | A1* | 12/2010 | Recker | H02J 7/025 315/291 |
| 2011/0133655 | A1* | 6/2011 | Recker | H02J 9/02 315/159 |
| 2011/0276193 | A1* | 11/2011 | Bowman | H05B 37/029 700/295 |
| 2011/0288793 | A1* | 11/2011 | Sanchez-Loureda | G01D 4/002 702/45 |
| 2011/0316623 | A1* | 12/2011 | Bohn | H03F 1/0227 330/127 |
| 2012/0066439 | A1* | 3/2012 | Fillingim | G06F 11/3485 711/103 |
| 2012/0146251 | A1* | 6/2012 | Heine | A61M 16/16 261/128 |
| 2012/0262093 | A1* | 10/2012 | Recker | H05B 33/0854 315/308 |
| 2012/0271477 | A1 | 10/2012 | Okubo et al. | |
| 2012/0316691 | A1* | 12/2012 | Boardman | H02J 3/26 700/293 |
| 2013/0154512 | A1* | 6/2013 | Covaro | H02J 13/0003 315/297 |
| 2014/0359324 | A1* | 12/2014 | Park | G09G 5/00 713/320 |

FOREIGN PATENT DOCUMENTS

| | | |
|---|---|---|
| WO | WO2012028981 A1 | 3/2012 |
| WO | WO2013062567 A1 | 5/2013 |

OTHER PUBLICATIONS

I. Mosely, Converter Technology, EDN, Europe, "LED Lighting Makes Maximum Use of PoE", Jan. 10, 2008, 2 pages.

* cited by examiner

CONTROLLING SYSTEM FOR CONTROLLING A POWER/DATA-COMMUNICATION SYSTEM

CROSS REFERENCE TO PRIOR APPLICATIONS

This application is the U.S. National Phase application under 35 U.S.C. § 371 of International Application Ser. No PCT/EP 2015/073891, filed on Oct. 15, 2015. which claims the benefit of European Patent Application No. 14189048.3, filed on Oct. 15, 2014. These applications are hereby incorporated ne reference herein.

FIELD OF THE INVENTION

The invention relates to a controlling system, method and computer program for controlling loads of a power/data-communication system like a Power-over-Ethernet (PoE) system. The invention relates further to a power/data-communication system comprising several loads and the controlling system.

BACKGROUND OF THE INVENTION

A power/data-communication system is, for instance, a PoE system. If in a PoE system comprising several PoE loads the PoE loads are switched on substantially simultaneously, relatively large inrush currents may be generated, which may, for instance, blow fuses or damage components of the PoE system.

WO 2012/028981 A1 discloses a management unit for a PoE installation. The management unit comprises several ports to which external devices can be connected, wherein the management unit is adapted to control the power delivered at a port in dependence on predetermined switching rules.

WO 2013/062567 A1 discloses a network power device comprising a network connector that can provide power and communications to the network power device, a power source that can provide power to the network power device, and a power negotiation module to negotiate for the power from a power sourcing equipment (PSE) device connected via the network connector. The network power device further comprises a failure indicator for indicating a negotiation failure.

SUMMARY OF THE INVENTION

It is an object of the present invention to provide a controlling system, method and computer program for controlling loads of a power/data-communication system like a PoE system, which allow for a reduction of the likelihood of blown fuses or damaged components of the power/data-communication system, especially if several loads should be switched on at substantially the same time. It is a further object of the present invention to provide a power/data-communication system comprising several loads and the controlling system.

In a first aspect of the present invention a controlling system for controlling loads of a power/data-communication system is presented, wherein the controlling system comprises:

a command providing unit for providing a command defining desired power levels of loads of the system, an overall power change determination unit for determining the overall power change amount, which will be caused by the provided command, based on the provided command, a control unit for controlling the loads such that the slope of the overall power consumption of the loads, when being set to the desired power levels, is reduced, if the determined overall power change amount is larger than a predefined power change threshold.

Thus, firstly it is determined whether the provided command can lead to an overall power change amount, which is so large that the overall power change amount may cause problems like blown fuses or damages to components of the power/data-communication system. If this is the case, i.e. if the overall power change amount is relatively large, the control unit controls the loads such that the slope of the overall power consumption of the loads, when being set to the desired power levels, is reduced, wherein this reduced slope of the overall power consumption allows for a reduction of the likelihood of, for instance, blown fuses or damaged components of the power/data-communication system.

The power/data-communication system is preferentially a combined power and data communication system which allows for a provision of power and for a data communication via the same connection, for instance, via the same cable. Preferentially, the power data communication system is a PoE system, wherein the loads are preferentially PoE loads, the command providing unit is preferentially a PoE command providing unit for providing a PoE command and the control unit is preferentially a PoE control unit. The PoE system is preferentially in accordance with the IEEE 802.af or IEEE 802.3at standard. However, the power/data-communication system can also be another system, which allows for the provision of power and for a data communication via a same connection, like a Universal Serial Bus (USB) system, a Power Line Communication (PLC) system, a Power over Data Line (PoDL) system, especially in accordance with the single pair Ethernet PoDL power IEEE802.3bu standard, et cetera. The power/data-communication system may also be a wireless power/data-communication system which allows for a wireless power and data transmission.

Moreover, the power/data-communication system is preferentially a lighting system and the several loads preferentially include lighting units. The command can directly or indirectly define a respective power level. For instance, the command can define certain actions to be carried out by the respective loads like switching on, changing the dim level and/or the color of light, if the loads are lighting units, moving the respective load, for example, moving a lighting head of a respective load, et cetera, wherein the overall power change determination unit may comprise a table or the like for determining the respective power level related to the respective action, in order to allow the overall power change determination unit to determine the overall power change.

The overall power change determination unit is preferentially adapted to determine the overall power change amount, which would be caused, if the power levels of the loads are set in accordance with the provided command at the same time, i.e. for instance, if the loads are switched on at substantially the same time in accordance with the command.

The command providing unit can be adapted to provide commands defining desired power levels of several loads and/or commands defining desired power levels of single loads. For example, in an embodiment a command can be provided by the command providing unit, which indicates that several or all of the loads of the power/data-communication system should be switched on.

In an embodiment the control unit is adapted to subdivide an individual power change amount, which is needed for a respective load for reaching the respective desired power level, into individual power change sub-amounts and to control the respective individual load such that its power level is changed in accordance with the respective individual power change sub-amounts at different times. Moreover, in an embodiment the control unit is adapted to control the power levels of the loads in accordance with the command such that different loads are set to their desired power levels at different times. This change of the power levels at different times leads to a very effective reduction of the slope of the overall power consumption.

In an embodiment the control unit is adapted to randomly control at which times the respective loads are set to their respective desired power levels. Thus, the respective power setting times may be randomly delayed, i.e. the loads may not be set to the desired power levels in a regular order, which might be defined by, for instance, their locations or addresses, but in a random manner. This can lead to the effect that in all areas, in which loads are located of which the power level should be changed, at least some power level changes are carried out at short notice. For example, if the loads are lighting units, all of these areas are at least slightly illuminated at relatively short notice. However, in an embodiment the power level setting times can also be distributed in other way in time, for instance, linearly.

In an embodiment the control unit is adapted to control the power levels of the loads in accordance with the command such that different loads are set to their desired power levels at different times within a predefined time interval. In particular, the control unit can be adapted to randomly distribute power level setting times, at which the respective loads are to be set to their respective power levels, over a predefined time interval and to control the loads in accordance with the randomly distributed power level setting times. The predefined time interval can be regarded as being a maximum random delay time.

It is preferred that the control unit is adapted to control the loads such that the slope of the overall power consumption of the loads will be larger, if the determined overall power change amount is smaller, and that the slope of the overall power consumption of the loads will be smaller, if the determined overall power change amount is larger. In particular, it is preferred that the control unit is adapted to control the power levels of the loads in accordance with the command such that different loads are set to their desired power levels at different power level setting times within a predefined time interval, wherein the predefined time interval is smaller, if the determined overall power change amount is smaller, and the predefined time interval is larger, if the determined overall power change amount is larger. Thus, the reduction of the slope can be adapted to the respective expected overall power change amount. This can lead to the effect that the reduced slope of the overall power consumption is not smaller than required for significantly reducing the likelihood of, for instance, blown fuses or damaged components of the power/data-communication system. In other words, the loads may reach their desired power levels still very fast, wherein the likelihood of, for instance, blown fuses or damaged components of the power/data-communication system is still reduced.

It is further preferred that the control unit is adapted to receive the command, to modify the command, if the determined overall power change amount is larger than the predefined power change threshold, and to send the modified command to the loads, wherein the command is modified such that the slope of the overall power consumption of the loads, when being set to the desired power levels, is reduced. Thus, the loads may be controlled in a relatively simply way by just modifying the command sent from the controlling system to the respective load, i.e. standard loads of the power/data acquisition system like known standard PoE loads may be used, wherein the control of the loads is modified by modifying the commands sent to the loads.

In a preferred embodiment the controlling system comprises a slope reduction rules providing unit for providing slope reduction rules defining the control of the loads such that the slope of the overall power consumption, when the loads are set to the desired power levels, is reduced, wherein the control unit is adapted to control the loads in accordance with slope reduction rules, if the determined overall power change amount is larger than the predefined power change threshold. Moreover, in an embodiment the controlling system comprises a power consumption measuring unit for measuring the slope of the overall power consumption of the loads, when the loads are controlled in accordance with the slope reduction rules, wherein the slope reduction rules providing unit is adapted to modify the slope reduction rules depending on the measured slope of the overall power consumption. In particular, if the measured slope of the overall power consumption of the loads is larger than expected, the slope reduction rules may be modified such that the slope will be smaller in future situations. For instance, if the slope of the overall power consumption is reduced by distributing the power level setting times of the different loads over a predefined time interval, this predefined time interval can be increased, in order to decrease the slope in future situations. In this way a self-learning process can be provided, which improves the slope reduction rules.

In an embodiment the controlling system comprises a power consumption measuring unit for measuring the slope of the overall power consumption of the loads, wherein the control unit is adapted to control the loads such that the slope of the overall power consumption of the loads is reduced, if the measured slope of the overall power consumption is larger than a predefined slope threshold. This can further reduce the likelihood of, for instance, blown fuses or damaged components of the power/data-communication system.

In a further aspect of the present invention a power/data-communication system is presented, wherein the power/data-communication system comprises several loads and a controlling system for controlling the loads of the power/data-communication system as defined in claim 1.

In a further aspect of the present invention a controlling method for controlling loads of a power/data-communication system is presented, wherein the controlling method comprises:
- providing a command defining desired power levels of the loads by a command providing unit,
- determining the overall power change amount, which will be caused by the provided command, based on the provided command by an overall power change determination unit,
- controlling the loads such that the slope of the overall power consumption of the loads when being set to the desired power levels is reduced, if the determined overall power change amount is larger than a predefined power change threshold, by a control unit.

In another aspect of the present invention a computer program for controlling loads of a power/data-communication system is presented, wherein the computer program comprises program code means for causing the controlling system as defined in claim 1 to carry out the steps of the controlling method as defined in claim 14, when the computer program is run on the controlling system.

It shall be understood that the controlling system of claim 1, the controlling method of claim 14 and the computer program of claim 15 have similar and/or identical preferred embodiments, in particular, as defined in the dependent claims.

It shall be understood that a preferred embodiment of the present invention can also be any combination of the dependent claims or above embodiments with the respective independent claim.

These and other aspects of the invention will be apparent from and elucidated with reference to the embodiments described hereinafter.

DETAILED DESCRIPTION OF EMBODIMENTS

Figure 1:
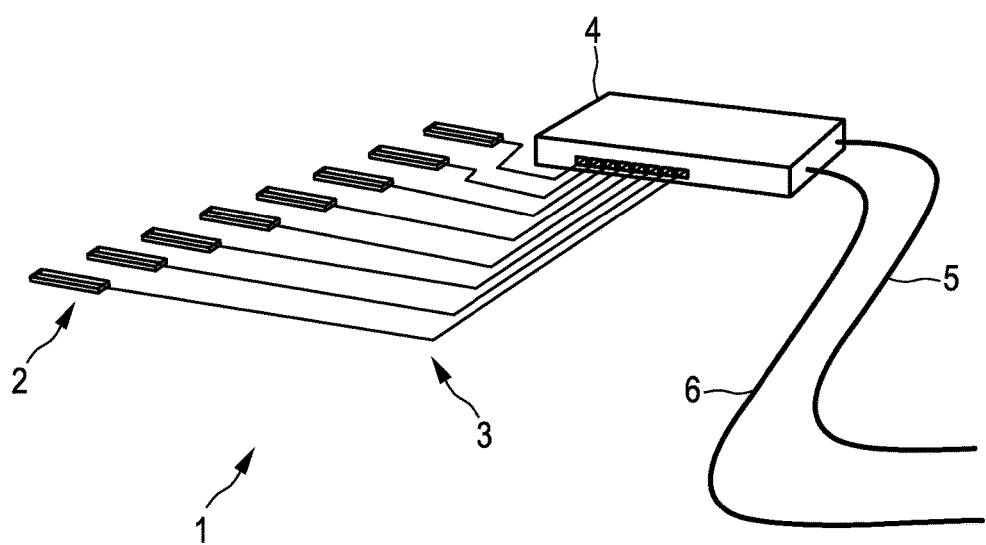
FIG. 1 shows schematically and exemplarily an embodiment of a PoE lighting system comprising PoE lighting units.

FIG. 1 shows schematically and exemplarily an embodiment of a power/data-communication system being a PoE lighting system 1 comprising several PoE lighting units 2 connected to a PoE controlling system 4 via Ethernet cables 3. In this embodiment the PoE controlling system 4 is PoE PSE. The PoE PSE receives a PoE command for controlling the PoE lighting units 2 via an Ethernet cable 5 and power via a power cable 6. Also the power cable 6 can be an Ethernet cable. However, the power cable 6 can also be another kind of cable for supplying power to the PoE PSE 4. The power can be supplied to the PoE PSE 4 via the cable 6 by, for instance, a mains power source or another PoE PSE. The PoE command can be provided to the PoE PSE 4 via the Ethernet cable 5 by a further control system which may request the PoE lighting units 2 to be switched on at certain times, for instance, in the morning when people arrive at an office, if the PoE lighting units are installed in the office.

Figure 2:
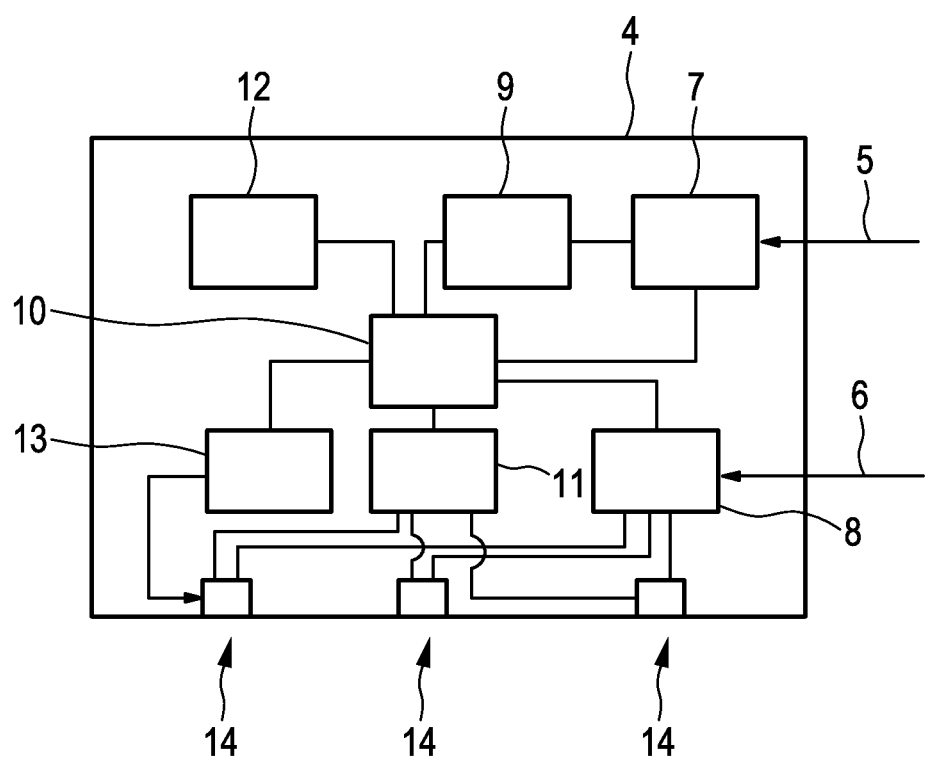
FIG. 2 shows schematically and exemplarily a PoE control system of the PoE lighting system shown in FIG. 1.

The PoE PSE 4 is schematically and exemplarily shown in more detail in FIG. 2. The PoE controlling system 4 comprises a PoE communication unit 7 for receiving a PoE command defining desired power levels of the PoE loads 2 via the Ethernet cable 5 and for providing the received PoE command to an overall power change determination unit 9 and a PoE control unit 10. Since the PoE communication unit 7 provides the PoE command to the overall power change determination unit 9 and the PoE control unit 10, it is regarded as being a PoE command providing unit. The overall power change determination unit 9 is adapted to determine, i.e. estimate, the overall power change amount, which will be caused by the provided PoE command, based on the provided PoE command. The PoE command defines desired power levels of the PoE loads 2, wherein based on the defined desired power levels of the PoE loads 2 and the current power levels of the PoE loads 2 the overall power change determination unit 9 can determine the overall power change amount, which will be caused if the provided PoE command will be executed. In an example all PoE lighting units 2 are switched off and the provided PoE command indicates that all PoE lighting units 2 should be switched on, wherein in this case the overall power change determination unit 9 determines the overall power change amount by aggregating the power required by each PoE lighting unit 2 in its respective switched-on state.

The PoE control unit 10 is adapted to control the PoE lighting units 2 such that the slope of the overall power consumption of the PoE lighting units 2, when being set to the desired power levels, for instance, when being switched on, is reduced, if the determined overall power change amount is larger than a predefined power change threshold. In this embodiment the PoE control unit is adapted to receive the PoE command, to modify the PoE command, if the determined overall power change amount is larger than the predefined power change threshold, wherein the PoE command can be modified such that several modified PoE commands to be sent to the different PoE lighting units are generated, and to send the modified PoE commands to the PoE lighting units 2 via a PoE communication unit 11, PoE connectors 14 and the Ethernet cables 3, wherein the PoE commands are modified such that the slope of the overall power consumption of the PoE lighting units 2, when being set to the desired power levels, is reduced. In particular, the PoE control unit 10 is adapted to control the PoE lighting units 2 in accordance with slope reduction rules provided by a slope reduction rules providing unit 12, if the determined overall power change amount is larger than the predefined power change threshold.

The PoE controlling system 4 further comprises a power distributor 8 for distributing the power received via the power cable 6 among the Ethernet connectors 14. In particular, the PoE control unit 10 negotiates the power to be supplied to the respective PoE lighting unit 2 via the PoE communication unit 11 with the respective PoE lighting unit 2, after the respective PoE lighting unit 2 has received the respective PoE command, and to control the power distributor 8 to distribute the power in accordance with the result of the negotiation. It should be noted that FIG. 2 only shows three Ethernet connectors 14 for clarity reasons. The PoE controlling system 4 can of course comprise more Ethernet connectors 14, for instance, eight Ethernet connectors as schematically and exemplarily illustrated in FIG. 1.

The PoE commands define certain actions to be carried out by the respective PoE lighting unit 2 like switching on, changing a dim level and/or the color of the light provided by the respective lighting unit 2, changing the direction of the light, et cetera. The overall power change determination unit 9 may comprise a table or the like for determining the respective power level associated with the respective action defined by the respective PoE command, in order to allow the overall power change determination unit 9 to determine the overall power change.

In this embodiment the PoE control unit 10 is adapted to control the power levels of the PoE lighting units 2 in accordance with the PoE commands such that different PoE lighting units 2 are set to their desired power levels at different times. Moreover, in this embodiment the PoE control unit 10 is adapted to randomly control at which times the respective PoE lighting units 2 are set to their respective desired power levels, wherein the corresponding power level setting times are randomly distributed within a predefined time interval which is defined by the slope reduction rules. This is schematically and exemplarily illustrated in FIG. 3.

Figure 3:
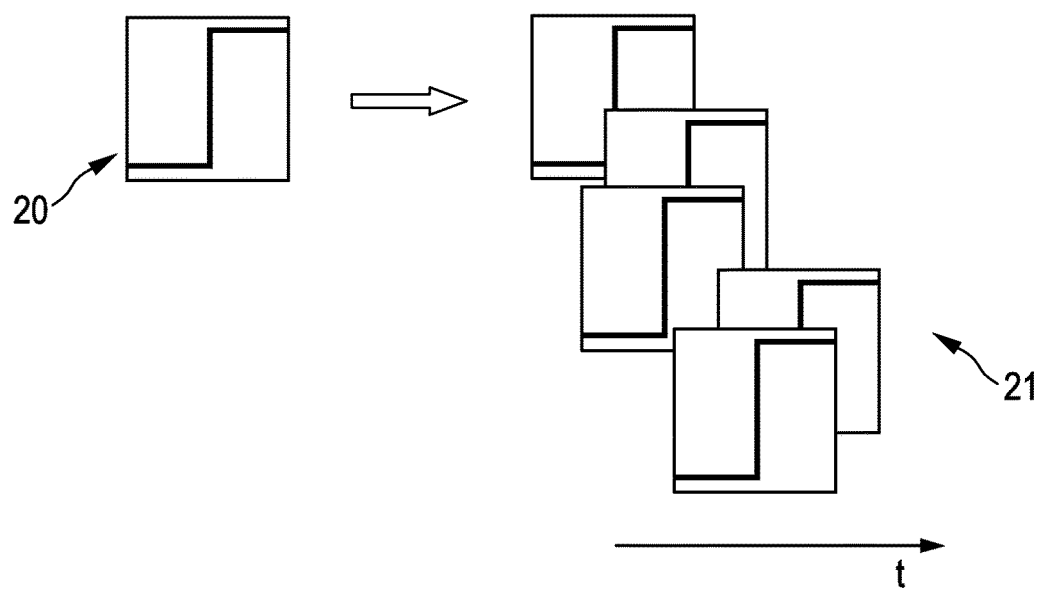
FIG. 3 illustrates schematically and exemplarily a modification of a PoE command, in order to reduce the slope of an overall power consumption of the PoE lighting units.

In the example illustrated in FIG. 3 a PoE command 20 has been received via the Ethernet cable 5, which indicates that all PoE lighting units 2 should be switched on. The PoE control unit 10 modifies this PoE command 20 in accordance with the slope reduction rules such that several PoE commands 21 are generated, which should be sent to the different PoE lighting units 2, wherein these PoE commands 21 are randomly distributed in time t over a predefined maximum random delay time, i.e. over the predefined time interval. Thus, if the PoE lighting units 2 should be switched on, not the light intensity may get ramped, in order to soften the power consumption step, but the PoE commands finally sent to the PoE lighting units get randomly delayed. In this example the maximum random delay time determines how much the power change gets stretched over time.

The PoE control unit 10 is preferentially adapted to control the PoE lighting units 2 such that the slope of the overall power consumption of the PoE lighting units 2 will be larger, if the determined overall power change amount is smaller, and that the slope of the overall power consumption of the PoE lighting units 2 will be smaller, if the determined overall power change amount is larger. In particular, the PoE control unit 10 is adapted to distribute the power level setting times, at which the different PoE lighting units 2 are set to their desired power levels, over a smaller predefined time interval, if the determined overall power change amount is smaller, and over a larger predefined time interval, if the determined overall power change amount is larger. For instance, if the determined overall power change is smaller than 10 W, the slope of the overall power consumption of the PoE lighting units 2, when being set to the desired power levels, may not be modified. If the determined overall power change is between 10 W and 30 W, the power level setting times may be spread over 10 ms. If the determined overall power change is between 30 W and 70 W, the power level setting times may be spread over 30 ms. If the determined overall power change is between 70 and 100 W, the power level setting times may be spread over 50 ms. And, if the determined overall power change is larger than 100 W, the power level setting times may be spread over 100 ms. Thus, a corresponding table or calculation formula may be used, in order to make low softening for a low amount of controlled power and strong softening when the power level, i.e. the determined overall power change, is high.

The PoE controlling system 4 further comprises a power consumption measuring unit 13 for measuring the power consumption of the PoE lighting units 2, especially for measuring the slope of the overall power consumption of the PoE lighting units 2, when the PoE lighting units 2 are controlled in accordance with the slope reduction rules. The slope reduction rules providing unit 12 is adapted to modify the slope reduction rules depending on the measured slope of the overall power consumption. The modification of the slope reduction rules can be defined by modification rules defining how the slope reduction rules should be modified depending on the measured slope of the overall power consumption. For instance, the modification rules can define that the predefined time interval, over which the power level setting times are distributed, should be enlarged by a predefined time, if the measured slope of the overall power consumption of the PoE lighting units 2 is larger than expected under consideration of the modified PoE commands 21 and the used predefined time interval. Thus, a power consumption, especially a current consumption, in reaction to certain PoE commands communicated through the PoE controlling system 4, which can be a PoE switch, can be monitored, wherein this monitoring can be used to automatically adapt the slope reduction rules.

In an embodiment the slope reduction rules providing unit is adapted to determine a predefined time interval, over which the power level setting times should be distributed, in an iterative procedure, wherein the iterative procedure is started with a predefined maximum time interval. Moreover, a target slope can be predefined for a predefined command. For instance, for a command defining that all PoE lighting units should be switched on a certain target slope of the overall power consumption can be predefined. The PoE control unit can then be adapted to control the power levels of the PoE loads in accordance with this predefined PoE command such that different PoE loads are set to their desired power levels at different times, wherein these power level setting times are distributed over the predefined maximum time interval. The power consumption measuring unit can then measure the slope of the overall power consumption of the PoE loads, and the measured slope can be compared with the predefined target slope. If the measured slope is smaller than the target slope, a predefined time can be subtracted from the predefined maximum time interval, in order to reduce the time interval, over which the power level setting times should be distributed, in the first step of the iterative procedure. In a next step of the iterative procedure the PoE control unit distributes the power level setting times over the reduced time interval obtained in the first step and the power consumption measuring unit measures the slope of the overall power consumption of the PoE loads again. The measured slope is compared with the target slope and, if the measured slope is still smaller than the target slope, the time interval is further reduced by subtracting the predefined time from the current time interval. These iterative steps may be repeated, until the measured slope is similar to the target slope, thereby defining an optimized time interval, which may be used during a normal operation of the PoE lighting system.

Thus, while performing the iterative procedure the monitoring of the randomized reaction allows for an adjustment of the time interval, over which the power level setting times are distributed, such that it is optimized. This can especially be interesting, if a PoE lighting unit takes more or less time to react than other PoE lighting units or has different delays for different lighting parameters and thus corresponding different commands. In particular, for each command defining power levels of the PoE loads a specific time interval may be determined by the iterative procedure.

The measured slope of the overall power consumption of the PoE lighting units 2 can also be used to control the PoE lighting units 2 such that the slope of the overall power consumption of the PoE lighting units 2 is reduced, if the measured slope of the overall power consumption is larger than a predefined slope threshold. Thus, the slope of the overall power consumption of the PoE lighting units 2 may not only be reduced, if the determined, i.e. estimated, overall power consumption change, which is determined by the overall power change determination unit, is larger than a predefined power change threshold, but also if the measured slope of the overall power consumption is larger than a predefined slope threshold.

Figure 4:
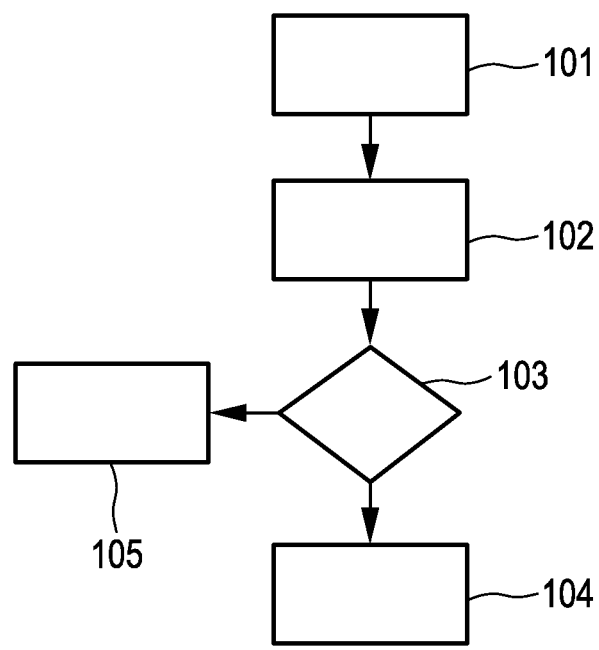
FIG. 4 shows a flowchart exemplarily illustrating an embodiment of a PoE controlling method for controlling the PoE lighting units of the PoE lighting system.

In the following an embodiment of the PoE controlling method for controlling PoE lighting units of a PoE lighting system will exemplarily be described with reference to a flowchart shown in FIG. 4.

In step 101 a PoE command defining desired power levels of the PoE lighting units is provided by a PoE command providing unit. For instance, a PoE command is provided, which indicates that several or all PoE lighting units should be switched on, thereby defining the respective power levels required by the PoE lighting units when switched on. In step 102 the overall power change amount, which will be caused by the provided PoE command, is determined, i.e. estimated, based on the provided PoE command by the overall power change determination unit. For instance, if several or all PoE lighting units should be switched on, the power levels required by the PoE lighting units to be switched on can be aggregated, in order to determine the overall power change amount. The overall power change determination unit can comprise a table containing information about the power levels required by the respective PoE lighting units when switched on. In step 103 it is determined whether the determined overall power change amount is larger than a predefined power change threshold. If this is the case, in step 104 the PoE lighting units are controlled such that the slope of the overall power consumption of the PoE lighting units 2, when being set to the desired power levels, is reduced. For instance, the corresponding power level setting times can be randomly distributed over a predefined time interval, which may be regarded as being a maximum delay time. If the determined overall power change amount is not larger than the predefined power change threshold, the PoE lighting units are just controlled in accordance with the unmodified PoE command provided in step 101. Thus, in step 105 the slope of the overall power consumption of the PoE lighting units, when being set to the desired power levels, is not reduced.

The Ethernet cables are not only used for the power transport, but also to control the lighting units remotely via IP protocol. The PoE commands are IP commands, which may address a substantial number of PoE lighting units, which may lead to a substantial power change, especially to a substantial current change. For instance, when before working hours a lighting control system of a building commands corridor lighting units on all floors in the building to be switched on, this may cause an inrush current at the PoE power supply side. Also when commands are erroneously distributed, which cause a high number of lighting units to blink, this may lead to problems such as blown fuses or damages to hardware. Also hacker attacks may target this issue.

The PoE system described above with reference to FIGS. 1 to 3 and the PoE controlling method described above with reference to FIG. 4 are therefore preferentially adapted to mitigate issues in current peaking due to load commands, i.e. due to the PoE commands. Potential issues in terms of inrush current and current spikes caused by the load control commands, i.e. by the PoE commands, are determined and, if the PoE commands may have the potential to cause trouble, the command flow is influenced, in order to reduce the overall power consumption rate, if the PoE lighting units are controlled in accordance with the PoE commands, especially to reduce the current change rate, and in this mitigate the problem. As general smoothing of the commands, even in a situation where inrush is not at risk, might be changing the intended lighting behavior too much, the PoE control system and method preferentially use an algorithm aggregating the number of addressed, i.e. targeted, lighting units and the related change in power consumption. The smoothing process, i.e. the reduction of the slope of the overall power consumption, can then be omitted, if the power change is below a given threshold.

Figure 5:
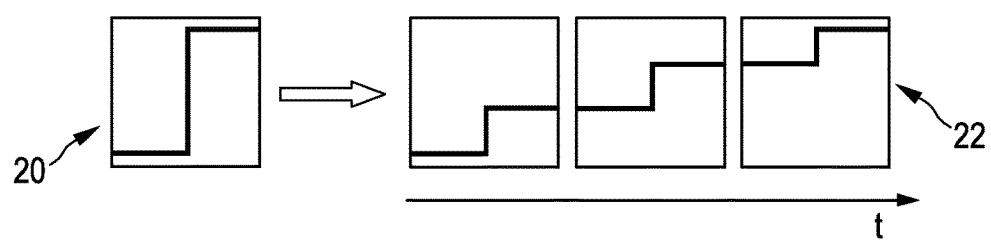
FIG. 5 illustrates schematically and exemplarily a further modification of a PoE command for reducing the slope of the overall power consumption of the PoE lighting units.

Although in an above described embodiment the power level setting times are distributed over a predefined time interval, in order to reduce the slope of the overall power consumption of the PoE lighting units, when being set to the desired power levels, in other embodiments the slope of the overall power consumption of the PoE lighting units can be reduced in another way. For instance, the PoE control unit 10 can be adapted to subdivide an individual power change amount, which is needed for a respective PoE lighting unit 2 for reaching the respective desired power level, into individual power change sub-amounts and to control the respective individual lighting unit 2 such that its power level is changed in accordance with the respective individual power change sub-amounts at different times. In particular, as schematically and exemplarily illustrated in FIG. 5, a PoE command 20 defining that all lighting units 2 should be switched on to their maximum light intensity can be modified to several dim-up PoE commands 22, wherein each dim-up PoE command 22 defines the respective intermediate dim state to which each lighting unit 2 should be set. Thus, for instance, on/off PoE commands in the data path can be modified into a series of dim-up/down commands, in order to slow the process. The number of intermediate dim states and the time to go over these dim states determines the stretching of the original power consumption step. Also these parameters can be defined by slope reduction rules, which may be modified during operation in an automatic self-learning process as described above. In particular, also in this embodiment a time interval, over which the dim states are distributed, can be determined in an iterative procedure which starts with a predefined maximum time interval, in order to distribute the consumption steps over a sufficient large, but not unnecessarily large, time interval. This is especially interesting, if different dim states lead to different power reaction steps, i.e. to different power consumption steps, for instance, in the case of a dimming with a black body line curve, where not only brightness but also spectral content are influenced, which may result in a non linear power-to-dim relation and a dim level dependent time delay.

Although in above described embodiments the PoE loads of the PoE system are lighting units, in other embodiments the PoE system can also comprise other PoE loads, in which the power change step is smoothed, in order to reduce the likelihood of, for instance, blown fuses or damaged components. The PoE system, which might be a PoE lighting system or another PoE system, may be used, for instance, in offices or other buildings.

The PoE system is a direct current (DC) power distribution system. In comparison to alternating current (AC) systems the DC power distribution systems allow for simplifications of load power components, energy saving by reduction of distribution and conversion losses as well as simplified integration of local green energy sources. But, DC power distribution systems often suffer from inrush—the effect of increased current consumption on device power on. Unlike done in AC systems, a DC load can beneficially have a capacitor at the power input terminals. Such a capacitor prevents that the current ripple of the load itself propagates fully to the power grid and smoothes spikes, especially short overvoltage pulses, in order to protect the load. But, such input capacitors would produce excessive currents whenever the grid needs to be powered up as all capacitances need to be charged at once. A specific source for inrush are, for instance, lighting devices based on halogen incandescent lamps, as the filament needs a multiple of nominal current until the lamp gets on temperature. Disadvantages of inrush can be, for instance, temporary power and equipment unavailability on startup, due to exceeded current limit, and user-noticeable power on/off effects caused by inrush and protection, like lights flashing, and systems failing to switch on after power drop.

The PoE loads may be grouped, wherein a PoE command provided by the PoE command providing unit may define the power levels of all PoE loads of a group. In particular, the PoE command can define that all PoE loads of a group should be switched on or off. For example, all lamps in one room may all be automatically controlled by a presence detector, or lamps in one room may be assigned to different groups, controlled by light sensors (for instance, for daylight integration at the window-side/corridor-side office lighting), or multiple workplace- or task-assigned buttons. In another example, enabling a hotel room before guest's arrival may require turning on of HVAC (Heating, Ventilation and Air Conditioning), default lighting and television for basic guest information or the like. In yet another example, powering a workplace may require turning on a desktop, a screen, a printer, loudspeakers and a smart phone docking station.

Although in above described embodiments the power/data communication system is a PoE system, in other embodiments the power/data acquisition system can also be another system like a USB system, a PLC system, a PoDL system et cetera. Especially the PoDL system may be used in automotive applications within a car like lighting applications or other applications within the car.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality.

A single unit or device may fulfill the functions of several items recited in the claims. The mere fact that certain measures are recited in mutually different dependent claims does not indicate that a combination of these measures cannot be used to advantage.

Procedures like the determination of the overall power change, the control of the loads, the modification of the slope reduction rules, et cetera performed by one or several units or devices can be performed by any other number of units or devices. For example, steps 102 to 105 can be performed by a single unit or by any other number of different units. These procedures, especially the control in accordance with the controlling method, can be implemented as program code means of a computer program and/or as dedicated hardware.

A computer program may be stored/distributed on a suitable medium, such as an optical storage medium or a solid-state medium, supplied together with or as part of other hardware, but may also be distributed in other forms, such as via the Internet or other wired or wireless telecommunication systems.

Any reference signs in the claims should not be construed as limiting the scope.

The invention relates to a controlling system for controlling loads, especially lighting units, of a power/data-communication system like a PoE system, wherein a command is provided, which defines desired power levels of loads of the power/data-communication system. An overall power change amount is determined, which will be caused by the provided command, and the loads are controlled such that the slope of the overall power consumption of the loads, when being set to the desired power levels, is reduced, if the determined overall power change amount is larger than a predefined power change threshold. Thus, if the provided command may lead to an overall power change amount causing problems like blown fuses, the loads are controlled such that the slope of the overall power consumption of the loads, when being set to the desired power levels, and hence the likelihood of, for instance, blown fuses is reduced.

The invention claimed is:

1. A controlling system for controlling loads of a power/data-communication system, wherein the controlling system comprises:
   a command providing unit for providing a command defining desired power levels of loads of the power/data-communication system,
   an overall power change determination unit for determining an overall power change amount caused by the provided command, based on the provided command,
   a control unit for controlling the loads such that a slope of an overall power consumption of the loads, when being set to the desired power levels, is reduced, if the determined overall power change amount is larger than a predefined power change threshold,
   wherein the control unit is adapted to subdivide an individual power change amount, which is needed for a respective load for reaching the respective desired power level, into individual power change sub-amounts and to control the respective individual load such that its power level is changed in accordance with the respective individual power change sub-amounts at different times.

2. The controlling system as defined in claim 1, wherein the control unit is adapted to control the power levels of the loads in accordance with the command such that different loads are set to their desired power levels at different times.

3. The controlling system as defined in claim 2, wherein the control unit is adapted to randomly control at which times the respective loads are set to their respective desired power levels.

4. The controlling system as defined in claim 2, wherein the control unit is adapted to control the power levels of the loads in accordance with the command such that different loads are set to their desired power levels at different times within a predefined time interval.

5. The controlling system as defined in claim 1, wherein the control unit is adapted to receive the command, to modify the command, if the determined overall power change amount is larger than the predefined power change threshold, and to send the modified command to the loads wherein the command is modified such that the slope of the overall power consumption of the loads, when being set to the desired power levels, is reduced.

6. The controlling system of claim 1, wherein the power/data-communication system is a lighting system and the loads are lighting units.

7. A controlling system for controlling loads of a power/data-communication system, wherein the controlling system comprises:
   a command providing unit for providing a command defining desired power levels of loads of the power/data-communication system, an overall power change determination unit for determining an overall power change amount caused by the provided command, based on the provided command, a control unit for controlling the loads such that a slope of an overall power consumption of the loads, when being set to the desired power levels, is reduced, if the determined overall power change amount is larger than a predefined power change threshold, wherein the control unit is adapted to control the loads such that the slope of the overall power consumption of the loads is larger, if the determined overall power change amount is smaller, and that the slope of the overall power consumption of the loads is smaller, if the determined overall power change amount is larger.

8. The controlling system as defined in claim 7, wherein the control unit is adapted to control the power levels of the loads in accordance with the command such that different loads are set to their desired power levels at different power level setting times within a predefined time interval, wherein the predefined time interval is smaller, if the determined overall power change amount is smaller, and the predefined time interval is larger, if the determined overall power change amount is larger.

9. The controlling system of claim 7, wherein the power/data-communication system is a lighting system and the loads are lighting units.

10. A controlling system for controlling loads of a power/data-communication system, wherein the controlling system comprises:
  a command providing unit for providing a command defining desired power levels of loads of the power/data-communication system,
  an overall power change determination unit for determining an overall power change amount caused by the provided command, based on the provided command,
  a control unit for controlling the loads such that a slope of an overall power consumption of the loads, when being set to the desired power levels, is reduced, if the determined overall power change amount is larger than a predefined power change threshold,
  wherein the controlling system comprises a slope reduction rules providing unit for providing slope reduction rules defining the control of the loads such that the slope of the overall power consumption, when the loads are set to the desired power levels, is reduced, wherein the control unit is adapted to control the loads in accordance with slope reduction rules, if the determined overall power change amount is larger than the predefined power change threshold.

11. The controlling system as defined in claim 10, wherein the controlling system comprises a power consumption measuring unit for measuring the slope of the overall power consumption of the loads, when the loads are controlled in accordance with the slope reduction rules, wherein the slope reduction rules providing unit is adapted to modify the slope reduction rules depending on the measured slope of the overall power consumption.

12. The controlling system of claim 10, wherein the power/data-communication system is a lighting system and the loads are lighting units.

13. A controlling system for controlling loads of a power/data-communication system, wherein the controlling system comprises:
  a command providing unit for providing a command defining desired power levels of loads of the power/data-communication system,
  an overall power change determination unit for determining an overall power change amount caused by the provided command, based on the provided command,
  a control unit for controlling the loads such that a slope of an overall power consumption of the loads, when being set to the desired power levels, is reduced, if the determined overall power change amount is larger than a predefined power change threshold,
  wherein the controlling system comprises a power consumption measuring unit for measuring the slope of the overall power consumption of the loads, wherein the control unit is adapted to control the loads such that the slope of the overall power consumption of the loads is reduced, if the measured slope of the overall power consumption is larger than a predefined slope threshold.

14. The controlling system of claim 13, wherein the power/data-communication system is a lighting system and the loads are lighting units.

* * * * *